Feb. 27, 1923.
L. W. WOODHALL
TIRE LOOSENING DEVICE
Filed Nov. 2, 1921
1,447,113
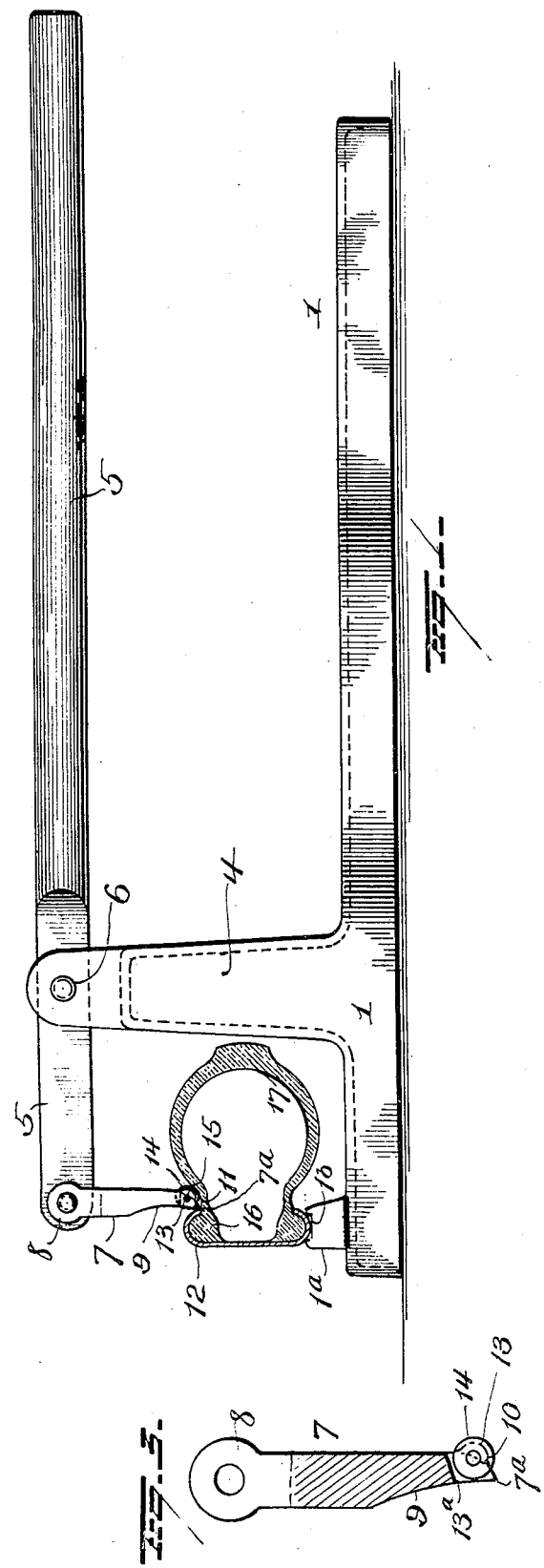
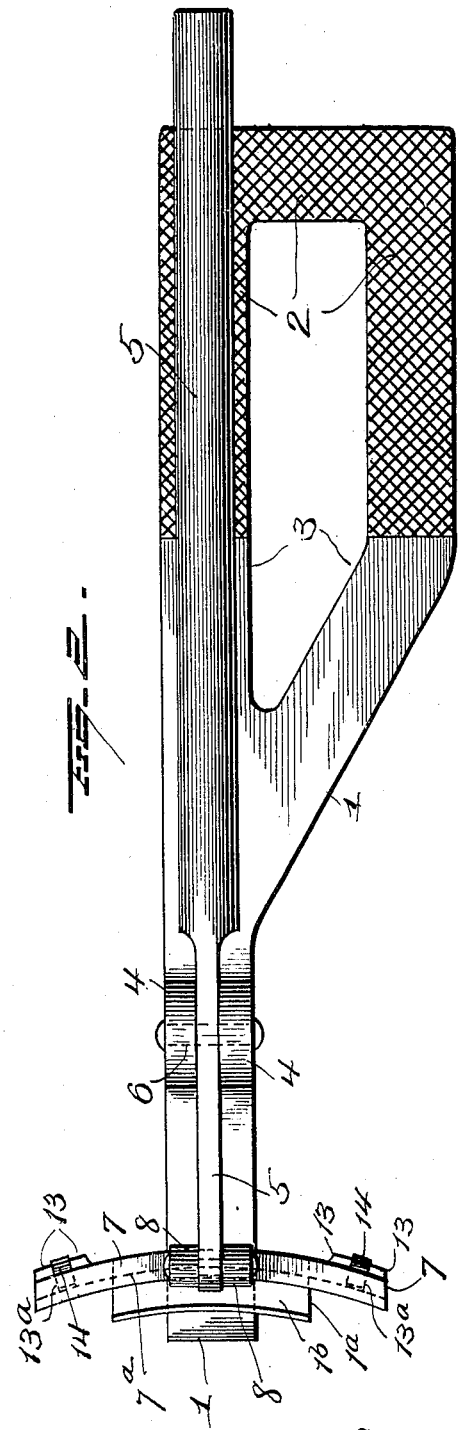
Inventor
L. W. Woodhall
Seymour & Bright
Attorneys Patented Feb. 27, 1923.

1,447,113

UNITED STATES PATENT OFFICE.

LOUIS W. WOODHALL, OF STAMFORD, CONNECTICUT.

TIRE-LOOSENING DEVICE.

Application filed November 2, 1921. Serial No. 512,245.

*To all whom it may concern:*

Be it known that I, LOUIS W. WOODHALL, a citizen of the United States, and a resident of Stamford, in the county of Fairfield and State of Connecticut, have invented certain new and useful Improvements in Tire-Loosening Devices; and I do hereby declare the following to be a full, clear, and exact description of the invention, such as will enable others skilled in the art to which it appertains to make and use the same.

This invention relates to improvements in tire loosening devices,—one object of the invention being to provide a simple and efficient portable device which can be held in position by the weight of the operator and which shall be operable, with the expenditure of a minimum effort on the part of the operator, quickly and easy to loosen a tire from a wheel rim when it is desired to remove the tire from the rim.

With this and other objects in view, the invention consists in certain novel features of construction and combinations of parts as hereinafter set forth and pointed out in the claims.

In the accompanying drawings, Figure 1 is a view in elevation of the device and showing the application thereof; Figure 2 is a plan view, and Figure 3 is a sectional view.

A portable base or platform, which may preferably be made of metal, is represented at 1, and a portion of this base may be made sufficient in width to accommodate the feet of the operator and this portion of the base is roughened as at 2 to prevent slipping of the operator. If desired the wider portion of the base may be provided with a slot or opening 3 so as to save metal and reduce weight. A standard 4 projects upwardly from the base 1, rearwardly from the forward end of the latter, and the upper end of said standard is bifurcated to receive a lever 5 which is pivotally attached thereto as indicated at 6. A loosening dog 7 is pivotally attached to the free end of the short arm of said lever and adapted to engage the tire and rim mounted upon the base 1 forwardly of the standard 4. In order that the rim and that portion of the tire which is connected therewith, shall be properly supported while the larger or major portion of the tire is resting upon the platform in front of the standard 4, I provide a cradle 1ᵃ upon the forward portion of the platform, said cradle consisting of a bar, curved to conform to the curvature of the rim and preferably grooved as at 1ᵇ to receive the latter.

The dog 7 consists of a bar curved concentric to the tire and rim and provided intermediate of its ends with lugs 8 to receive the forward end of the lever 5 and the pivot pin which connects said dog therewith. The forward face of the dog or bar 7 is formed with a curved recessed portion as indicated at 9 and the lower edge portion of said dog or bar is curved as at 10,—the curved portion 9 and the curved portion 10 meeting to form what may be termed an elongated tooth 7ᵃ to engage the edge portion of the flange 11 of a rim 12. The dog or bar 7 is provided near its respective ends and lower edge portion with rearwardly projecting enlargements 13 in which the journals of rollers 14 are mounted and said bar is recessed as at 13ᵃ for the accommodation of said rollers, the latter being thus disposed behind the engaging edge 7ᵃ of the dog or bar 7 and said rollers are adapted to contact with the curved side portion 15 behind the circumferential bead 16 of a tire 17.

With the construction and arrangement of parts as above described, it will be seen that when the handle end of the lever 5 is raised, the short arm of said lever will be depressed and the rollers 14 engaging the curved side portion 15 of the tire will cause the free edge of the dog or bar 7 to move forwardly and force the contacting or toothed portion 7ᵃ of the bar or dog to engage the flange of the rim and tend to move under the same—the downward movement of the dog or bar and the rollers carried thereby serving to force the bead or flanged portion of the tire away from the flange of the rim and thus loosen a portion of the tire from the rim. The tire and rim may be moved step by step and the above operation repeated until the tire shall have been loosened from the rim throughout the full extent of the same.

Having fully described my invention what I claim as new and desire to secure by Letters-Patent, is:—

1. A tire tool comprising a base constituting a foot-rest for an operator, a standard rising from said base, a lever fulcrumed upon the upper end of the standard and extending longitudinally of the base, a dog pivoted to and depending from the forward end of the lever and having its lower end forming a forwardly projecting laterally elongated tooth to engage the upper edge of a rim supported edgewise across the base, and rearwardly projecting members on the rear side of the dog adjacent the ends of the same to bear upon the side of a tire immediately adjacent the rim.

2 A tire tool comprising a base constituting a foot-rest for an operator, a standard rising from the base, a lever fulcrumed on and extending across the upper end of the standard longitudinally of the base, a cradle on the forward end of the base transversely thereto to support a rim and tire turned on side, a dog pivoted to and depending from the forward end of the lever and extending transversely of the base, the lower ege of the dog on the forward face of the same constituting a forwardly projecting tooth to engage the edge of the rim and the dog being provided with transverse recesses in its lower edge adjacent its ends, and rollers mounted in said recesses with their peripheries projecting from the rear face of the dog to bear upon the side of the tire immediately adjacent the edge of the rim.

In testimony whereof, I have signed this specification in the presence of two subscribing witnesses.

LOUIS W. WOODHALL.

Witnesses:
BENJAM J. DAVIS,
ALEXANDER GIBSON.